United States Patent [19]

Kunda et al.

[11] 4,150,095

[45] Apr. 17, 1979

[54] RECOVERING MAGNETITE AND AMMONIUM SULPHATE FROM AMMONIUM JAROSITE

[75] Inventors: Wasyl Kunda, Edmonton; Herbert Veltman, Fort Saskatchewan, both of Canada

[73] Assignee: Sherritt Gordon Mines Limited, Toronto, Canada

[21] Appl. No.: 876,778

[22] Filed: Feb. 10, 1978

[30] Foreign Application Priority Data

Jan. 12, 1978 [CA] Canada .................................. 294873

[51] Int. Cl.² ...................... C01G 49/14; C01G 49/08; C01C 1/246
[52] U.S. Cl. .................................... 423/145; 423/152; 423/548; 423/632
[58] Field of Search ............... 423/145, 146, 150, 545, 423/548, 632, 633, 517

[56] References Cited

U.S. PATENT DOCUMENTS

| | | | |
|---|---|---|---|
| 2,776,207 | 1/1957 | Mancke | 423/145 |
| 2,871,116 | 1/1959 | Clark | 423/145 |
| 3,436,177 | 4/1969 | Spedden et al. | 423/145 |
| 3,691,038 | 9/1972 | Von Roepenack et al. | 423/146 |
| 3,910,784 | 10/1975 | Rastas | 423/633 |

OTHER PUBLICATIONS

Mellor, *Inorganic and Theoretical Chemistry*, vol. XIV, Longmans Green, Co., NY (1935), pp. 328, 343, 344.

*Primary Examiner*—Brian Hearn
*Attorney, Agent, or Firm*—Robert F. Delbridge; Arne I. Fors

[57] ABSTRACT

Ammonium jarosite is converted to hematite or magnetite and ammonium sulphate. The invention can be used for removing iron from a feed solution containing dissolved ferrous sulphate. The feed solution is treated with ammonium sulphate and oxygen to precipitate ammonium jarosite which is then separated from the treated solution to produce an ammonium jarosite slurry and a separated solution containing sulphate ions. The ammonium jarosite slurry is treated with ammonia to convert the ammonium jarosite to hematite or magnetite and ammonium sulphate solution. The ammonium sulphate solution is separated from the hematite or magnetite, and a portion of the separated ammonium sulphate solution is recycled to the ammonium jarosite precipitation step, the remaining portion of the separated ammonium sulphate solution being recovered.

4 Claims, 2 Drawing Figures

2

RECOVERING MAGNETITE AND AMMONIUM SULPHATE FROM AMMONIUM JAROSITE

This invention relates to a process for recovering iron oxide and ammonium sulphate from ammonium jarosite, and to the use of this process in removing iron from a feed solution containing dissolved ferrous sulphate.

Many known hydrometallurgical processes utilize one or more leaching steps to dissolve a desired non-ferrous metal or metals from the original metal containing material, and the undissolved leach residue is separated from the leach solution containing the dissolved metal values. Many original nonferrous metal containing materials also contain a significant amount of iron which at least partially dissolves in the leaching step, with the result that the leach solution frequently contains dissolved ferrous sulphate as well as the dissolved metal values. For example, the treatment of sulphidic ores with an acid leach medium usually produces a leach solution in which ferrous sulphate is also present. In such process, the leach solution may contain an iron concentration as high as 30 to 90 grams per liter. It is consequently necessary to remove at least a substantial portion of the dissolved ferrous iron from the leach solution before the dissolved nonferrous metal values are recovered therefrom. The leach solution may also have to be subjected to various other purification steps before the desired metal values are recovered from the leach solution, depending upon the nature of any other contaminating elements present.

The present invention is applicable to hydrometallurgical processes as mentioned above, and to the removal of iron from other solutions containing dissolved ferrous sulphate. For example, pickling of steel in sulphuric acid solution for cleaning purposes is well known. As each steel article is cleaned, small amounts of iron dissolve in the sulphuric acid to produce ferrous sulphate solution, with the resulting solution (known as pickle liquor) becoming so concentrated with dissolved ferrous sulphate that is necessary to regenerate the pickle liquor by removal of a substantial proportion of the ferrous iron therefrom. Thus, the present invention can also be used for the regeneration of pickle liquor. The invention is in fact generally applicable to the removal of iron from solutions containing dissolved ferrous sulphate.

Various techniques have been used or suggested for the removal of ferrous iron from solution. For example, it has been proposed to precipitate iron as basic iron sulphate, goethite, hematite, magnetite or jarosite. Precipitation of iron as jarosite has certain advantages over the other alternatives mentioned. For example, jarosite precipitation tends to provide more efficient iron removal, and a jarosite precipitate usually has good settling and filtration characteristics. Also, jarosite precipitation from a solution containing dissolved values of such metals as copper, nickel, cobalt or zinc tends to coprecipitate only relatively small amounts of these metals with the jarosite, this being a particularly important advantage in hydrometallurgical processes as described above. Jarosite precipitation also regenerates sulphuric acid and oxidizes ferrous iron to ferric iron. The jarosite precipitate is generally discarded.

Jarosite compounds have the general formula $MFe_3(SO_4)_2(OH)_6$, in which M can represent various radicals, the more commercially important jarosite compounds being ammonium jarosite and sodium jarosite, where M is the ammonium ion or the sodium ion respectively.

The precipitation of dissolved iron as jarosite however has disadvantages in that the cost of the necessary reagents is relatively high, and the jarosite precipitate is relatively bulky, thus presenting problems with its disposal.

It is therefore an object of the invention to provide a process for the removal of iron from solutions containing dissolved ferrous sulphate in which the iron is precipitated as jarosite and the jarosite is subsequently converted to commercially useful products.

The present invention is based on the discovery that it is possible to convert ammonium jarosite in a reasonable time under relatively mild conditions, that is to say without undesirably high pressures or temperatures, into an insoluble iron oxide and soluble ammonium sulphate, the iron oxide being hematite or magnetite.

The feed solution containing dissolved ferrous sulphate can be treated with ammonium sulphate and oxygen in such a manner as to precipitate ammonium jarosite, with the precipitated ammonium jarosite then being separated from the treated solution to produce an ammonium jarosite slurry and a separated solution containing sulphate ions. The ammonium jarosite slurry is then treated with ammonia to convert the ammonium jarosite to an insoluble iron oxide and soluble ammonium sulphate, the iron oxide being hematite or magnetite. The ammonium sulphate solution can then be separated from the insoluble iron oxide, and at least a portion of the separated ammonium sulphate solution recycled to the ammonium jarosite precipitation step, with the remaining portion of the separated ammonium sulphate solution being recovered. Thus, the jarosite precipitate does not have to be stored, since it is converted to an insoluble iron oxide, namely hematite or magnetite, and ammonium sulphate. The cost of reagents is reduced because of the recycling of a portion of the ammonium sulphate solution produced. The iron oxide produced in pure enough to be a useful source of iron, the remaining ammonium sulphate is commercially valuable, for example in fertilizer production, and the solution containing sulphate ions is a potential source of sulphuric acid, which is another commercially useful product.

As mentioned earlier, jarosite can be precipitated from feed solution containing dissolved ferrous sulphate and also containing dissolved values of metals such as copper, nickel, cobalt or zinc, as well as other various dissolved contaminants. With appropriate process conditions, jarosite of relatively high purity can be precipitated, that is to say without any substantial coprecipitation of the dissolved non-ferrous metals or contaminants. One suitable jarosite precipitation step is described in Canadian patent application No. 285,090, filed Aug. 19, 1977 in the names of V. B. Sefton et al. This application describes the formation of ammonium jarosite by treatment of ferrous sulphate containing solution with oxygen and ammonium sulphate, with the reaction also producing sulphuric acid. The jarosite precipitate can be separated form the acid solution to produce an aqueous jarosite slurry, and the sulphuric acid solution can be utilized elsewhere.

As mentioned above, it has been found that the decomposition of ammonium jarosite into iron oxide in the form of hematite or magnetite can be achieved in a reasonable time under relatively mild process conditions. Further, the decomposition step can be carried out in such a way that only relatively small changes in process conditions are needed to produce the iron oxide in the form of hematite or in the form of magnetite.

To produce hematite in accordance with the invention, the jarosite slurry is reacted with ammonia under the following conditions. The temperature should be between about 50° C and about 100° C. Below 50°C., not only is the reaction rate undesirably slow, but the iron oxide precipitate produced is in the form of a very slimy residue with poor filtration characteristics. At the higher end of the temperature range, a more crystalline precipitate is produced. It is not necessary to employ temperatures above 100° C. to effect a satisfactory reaction. In this reaction, two moles of ammonia are required for each mole of sulphur, and for completeness of reaction a small excess of ammonia over this ratio is desirable.

The jarosite is decomposed while present in an aqueous slurry. The pulp density of the slurry may be relatively high, that is to say high enough such that the concentration of the resultant ammonium sulphate solution approaches saturation.

Thus, the ammonium jarosite precipitate can be decomposed by the action of ammonia at atmospheric pressure with the ammonium jarosite present as an aqueous slurry of relatively high pulp density and at a temperature between about 50° C. and about 100° C.

To produce magnetite in accordance with the invention, ferrous sulphate solution is required in the jarosite slurry. Surprisingly, a ferric to ferrous iron molar ratio of about 1:1 was found to be preferable for the best production of magnetite, as measured by the magnetic properties of the product. It would have been expected that a ferric to ferrous iron molar ratio of about 2:1 would give the best results in this respect, but this was not so. A variation in ferric to ferrous molar ratio in either way from the preferred 1:1 ratio produces a product with inferior magnetic properties, thus indicating incomplete formation of magnetite.

A temperature range of from about 25° C. to about 100° C. was found to be adequate for magnetite production, a lower temperature being possible for magnetite production than with hematite production because the settling rate for magnetite was less affected by lower temperature than was the settling rate for hematite.

The quantity of ammonia present was found to have a significant effect on magnetite formation, it being found necessary to provide an ammonia to sulphur molar ratio of at least about 1.3:1.

BRIEF DESCRIPTION OF THE DRAWINGS

In FIG. 1, feed solution containing ferrous sulphate is supplied to ammonium jarosite precipitation step 1 where the ferrous sulphate is reacted with oxygen and ammonium sulphate to form an ammonium jarosite precipitate and sulphuric acid solution, with the jarosite precipitate then being separated from most of the sulphuric acid solution in a liquid-solids separation step 2. If the feed solution contains values of dissolved metals such as copper, nickel, cobalt or zinc, these metal values will be present in the acid solution, which may consequently be treated for the recovery of the metal values.

The jarosite precipitated is slurried with water to produce an aqueous slurry of the required pulp density. The jarosite slurry is then treated with ammonia in conversion step 3 to convert the jarosite to insoluble hematite and ammonium sulphate solution, with the hematite then being separated from the solution in liquid-solids separation step 4. Part of the separated ammonium sulphate solution is recycled to the jarosite precipitation step 1 to supply the required ammonia, and the remaining solution is used for any suitable purpose, such as in fertilizer production. Ammonium sulphate can be crystallized from the solution if desired. The hematite can be used as a source of iron or used as hematite in accordance with its normal uses.

Figure 1:
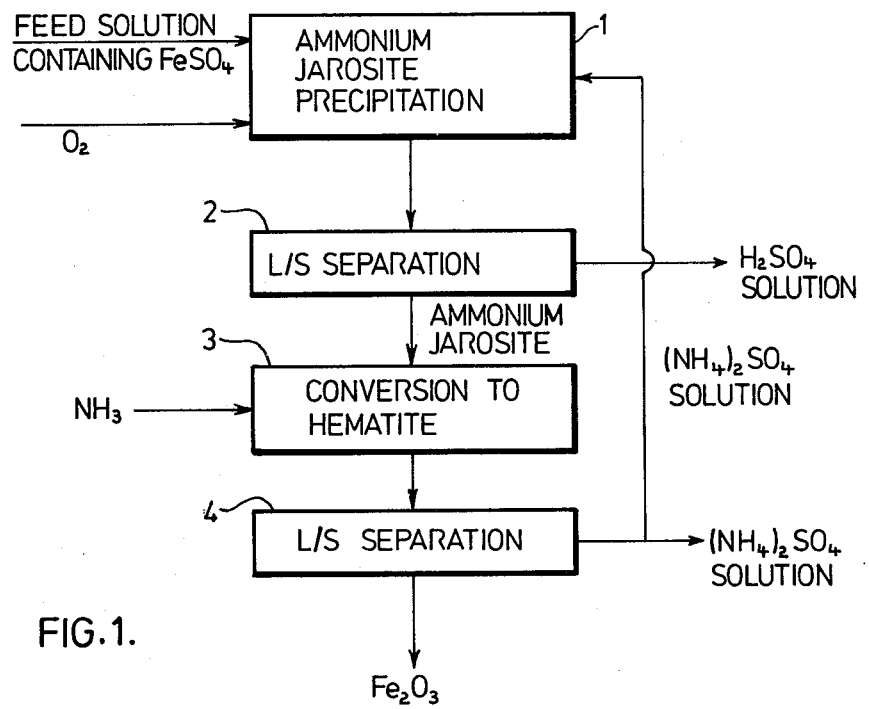
FIGS. 1 and 2 of the accompanying drawings show flow diagrams for the production of hematite and magnetite respectively from ferrous sulphate solution by producing ammonium jarosite which is then decomposed in accordance with the invention.
Figure 2:
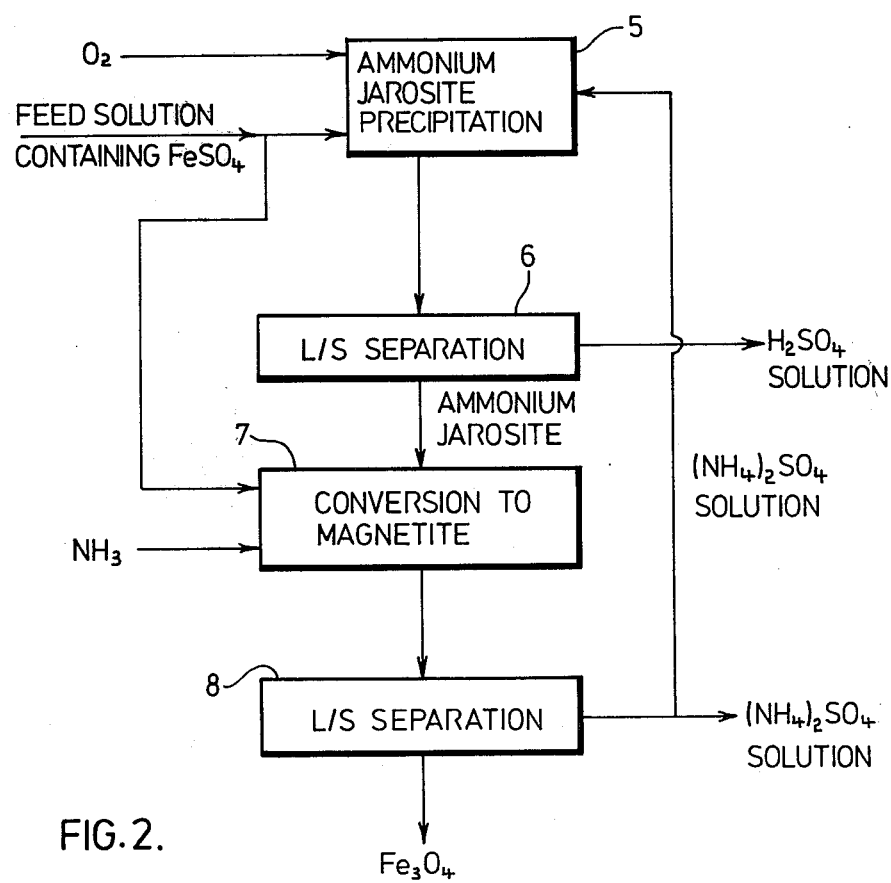

In FIG. 2, feed solution containing ferrous sulphate is fed to jarosite precipitate step 5, except for a portion which is used subsequently as will be described later. In jarosite precipitation step 5, the ferrous sulphate is reacted with oxygen and ammonium sulphate to form ammonium jarosite and sulphuric acid. The jarosite precipitate is separated in liquid-solids separation step 6 from most of the sulphuric acid solution. As in the previous case described with reference to FIG. 1, where the feed solution contains values of dissolved metal such as copper, nickel, cobalt or zinc, these values will be present in the acid solution which may consequently be treated for recovery of the metal values.

The jarosite precipitate is slurried with water to produce an aqueous slurry of the required pulp density, and this slurry is then treated with ferrous sulphate solution from the initial feed solution and with ammonia to convert the ammonium jarosite to insoluble magnetite and ammonium sulphate solution in conversion step 7. The magnetite is then separated from the solution in a liquid/solids separation step 8, with part of the separated ammonium sulphate solution being recycled to the jarosite precipitation step 5 to provide the ammonia requirements, and with the remaining ammonium sulphate solution being used as desired. The magnetite can be used as a source of iron or used in accordance with its normal uses.

The processes as described with reference to FIGS. 1 and 2 clearly show the advantages of the invention with respect to efficient use of the various reagents concerned and with respect to the production of useful end products.

Specific examples of the invention will now be described.

Ammonium jarosite was precipitated from a ferrous sulphate solution containing 60 gpl ferrous iron, 50 gpl sulphur, 3 gpl copper, 18 gpl zinc and 5 gpl magnesium. The solution was treated at a temperature of 185° C. with an approximately stoichiometric quantity of ammonia required for jarosite precipitation and with oxygen under a partial pressure of 350 kPa for 0.75 hour to precipitate ammonium jarosite. The size of the jarosite particles precipitated was predominantly below 20 microns, and the jarosite contained only 0.02% copper, 0.05% zinc, and 0.01% magnesium.

Various tests were then carried out. For each test, the jarosite was slurried in water to produce an aqueous slurry containing from 2 to 3 mol/l iron, the slurry being produced in an agitated open vessel which was then heated to the required temperature. Concentrated ammonia solution was slowly injected into the agitated slurry at the reaction temperature and, on the completion of each test, the slurry was filtered, and the washed iron residue and the filtrate were analyzed.

In one test, ammonia was added at a slurry temperature of 100° C. to give a NH₃/S molar ratio of 2.6:1. After one hour, it was found that the filtered residue was virtually 100% hematite. During the reaction, the slurry was diluted by ammonia addition and the solids content of the slurry decreased from 488 gpl to 263 gpl, with the resultant concentration of ammonium sulphate being 242 gpl. The product slurry had a settling rate of 3 cm/h and a filtration rate of 110 l/h/m². The size of the hematite particles precipitated was 80% less than 5 microns.

In another test, ferrous sulphate solution was used to form the ammonium jarosite slurry and then to this slurry further ferrous sulphate solution was added until the system then contained about 3 mol/l iron, namely 1.5 mol/l $Fe^{2+}$ and 1.5 mol/l $Fe^{3+}$. The slurry was treated at 100° C. with concentrated ammonia solution to give a NH₃/S molar ratio of 2:1. After one hour, the resultant magnetite slurry contained 180 gpl solids and 242 gpl ammonium sulphate. The settling rate of the solids was 6 cm/h and the filtration rate was 48 l/h/m². The magnetite particles were 54% less than 5 microns, with 30% being over 44 microns due to some agglomeration. The magnetite gave a Satmagan reading of 73.8 which indicates good magnetic properties. Satmagan is the trade name of a saturation magnetization analyzer in the form of an apparatus in which the sample is weighed in the gravitational field and in a magnetic field strong enough to magnetically saturate the sample, with the reading in this case being directly proportional to the percentage of magnetite in the sample.

Analysis, physical properties and screen size distribution of the iron oxide products in these tests are shown in the following table. The relative purity of the hematite and magnetite is clearly apparent.

Other embodiments and examples of the invention will be apparent to a person skilled in the art, the scope of the invention being defined in the appended claims.

What we claim as new and desire to protect by Letters Patent of the United States is:

1. A process for removing iron from a feed solution containing dissolved ferrous sulphate, including treating the feed solution with ammonium sulphate and oxygen to precipitate ammonium jarosite, separating the precipitated ammonium jarosite from the treated solution and producing an ammonium jarosite slurry and a separated solution containing sulphate ions, treating the ammonium jarosite slurry with ammonia in the presence of ferrous ions under substantially atmospheric pressure conditions at a temperature in the range of from about 25° C. to about 100° C. to convert the ammonium jarosite to magnetite and ammonium sulphate solution, separating the ammonium sulphate solution from said magnetite, recycling a portion of the separated ammonium sulphate solution to the ammonium jarosite precipitation step, and recovering a remaining portion of the separated ammonium sulphate solution.

2. A process according to claim 1 wherein the concentration of ferrous ions is such that the molar ratio of ferric ions in the ammonium jarosite to the ferrous ions is about 1:1.

3. A process for recovering iron oxide and ammonium sulphate from ammonium jarosite including treating an ammonium jarosite slurry with ammonia in the presence of ferrous ions under substantially atmospheric pressure conditions at a temperature in the range of from about 25° C. to about 100° C. to produce iron oxide in the form of magnetite and ammonium sulphate solution.

4. A process according to claim 3 wherein the concentration of ferrous ions is such that the molar ratio of ferric ions in the ammonium jarosite to the ferrous ions is about 1:1.

TABLE I

| Analyses (%) | | | | Physical Properties | | | Buckbee-Mears Screen Size (%) | | | | | |
| --- | --- | --- | --- | --- | --- | --- | --- | --- | --- | --- | --- | --- |
| Fe | S | O₂ | C | AD gpl | FN | S.A. m²/g | −5 μm | 5/10 μm | 10/20 μm | 20/30 μm | 30/44 μm | +44 μm |
| 65.6 | 0.10 | 36.2 | 0.17 | 0.53 | <0.2 | 218 | 80 | 6 | 2 | 2 | 2 | 8 |
| 67.3 | 0.34 | 27.1 | 0.05 | 0.74 | <0.2 | 80 | 54 | 2 | 2 | 4 | 8 | 30 |